United States Patent
Gaumain

(10) Patent No.: US 6,913,197 B2
(45) Date of Patent: Jul. 5, 2005

(54) METHOD FOR INDUCING UPGRADING OF AN EXPANDABLE PRODUCT

(75) Inventor: Serge Gaumain, Yverdon (CH)

(73) Assignee: NagraCard S.A. (CH)

( * ) Notice: Subject to any disclaimer, the term of this patent is extended or adjusted under 35 U.S.C. 154(b) by 28 days.

(21) Appl. No.: 10/416,570

(22) PCT Filed: Nov. 12, 2001

(86) PCT No.: PCT/IB01/02130

§ 371 (c)(1),
(2), (4) Date: May 13, 2003

(87) PCT Pub. No.: WO02/39740

PCT Pub. Date: May 16, 2002

(65) Prior Publication Data

US 2004/0026494 A1 Feb. 12, 2004

(30) Foreign Application Priority Data

Nov. 13, 2000 (CH) .............................................. 2201/00

(51) Int. Cl.$^7$ .................................................. G06K 7/08
(52) U.S. Cl. .......................... 235/451; 235/382; 380/211
(58) Field of Search ............................... 235/451, 382; 709/200; 380/211

(56) References Cited

U.S. PATENT DOCUMENTS

| | | | | |
|---|---|---|---|---|
| 5,237,610 A | * | 8/1993 | Gammie et al. | 380/228 |
| 5,475,740 A | * | 12/1995 | Biggs et al. | 379/91.02 |
| 5,793,952 A | * | 8/1998 | Limsico | 713/202 |
| 5,857,024 A | * | 1/1999 | Nishino et al. | 713/172 |
| 6,085,976 A | * | 7/2000 | Sehr | 235/384 |
| 6,276,604 B1 | * | 8/2001 | Proidl | 235/382 |
| 6,642,940 B1 | * | 11/2003 | Dakss et al. | 345/723 |
| 6,745,223 B1 | * | 6/2004 | Nobakht et al. | 709/200 |

FOREIGN PATENT DOCUMENTS

| | | |
|---|---|---|
| EP | 0616714 | 4/1994 |
| GB | 2321753 | 8/1998 |
| WO | WO 00 01149 | 1/2000 |
| WO | WO 0046993 | 8/2000 |

* cited by examiner

Primary Examiner—Diane I. Lee
Assistant Examiner—Seung H Lee
(74) Attorney, Agent, or Firm—Steven B. Kelber; DLA Piper Rudnick Gray Cary US LLP

(57) ABSTRACT

The security modules used in pay television and in other applications are intended to develop and thus to be replaced. In order to promote the replacement of a previous generation by a new one, the method according to the invention consists in sending by a control center in the data stream a replacement prompt command including the minimal characteristics of the security module of the new generation, establishing the characteristics of the security module being used, and comparing with the minimal characteristics defined by the received command, and according to the results of this comparison, prompting the user to replace the security module.

24 Claims, 1 Drawing Sheet

METHOD FOR INDUCING UPGRADING OF AN EXPANDABLE PRODUCT

This application is a 371 of PCT/IB01/02130 filed on 12 Nov. 2001, which claims for foreign priority based upon an application number 2201/00 filed in Switzerland on 13 Nov. 2000.

BACKGROUND

Technical Field

The present invention concerns a method for the upgrading of an expandable product, particularly in the field of smart cards.

DESCRIPTION OF THE BACKGROUND

All operators that use electronic and computer systems are faced with the upgrading of their products and the management of compatibility between the different versions. This matter is very important as the number of these products is big and distributed on a large scale.

As these products are linked, even sporadically, to a control centre, the first approach of the operators has been to make this software modifiable by downloading. This technique was made possible thanks to the EEPROM or Flash memories that accept reprogramming without needing a permanent power supply.

In this way, when new functions appear, the downloading of the new software in these products allows the users to benefit from these functions without having to return their products to any technical centre.

In a one-way configuration, that is, a configuration in which only the link between the operator and the user is possible, it is difficult, even impossible, to determine if all the users have received the upgrading.

Thus, the operators are forced to manage the compatibility with several versions in parallel so that the users that have not received the upgrading can benefit from the proposed service.

This example can even be intensified when changing the generation of the product, that is, that a physical replacement of the product is necessary.

For this purpose the operators send the users the new generation of the product with the invitation of using this new product in the place of the previous one.

When an operator proposes a charged service, it is very difficult to impose the use of the new product suppressing all compatibility with the old product. This would result in to create dissatisfaction in his clientele, which feel not very concerned by technical aspects considerations.

SUMMARY

This is why the operators are presently constrained, out of fear of letting down their clients, to ensure not only the compatibility between the software versions, but also between the material generations. This compatibility is costly in terms of bandwidth when communicating with the products because commands must be sent according to all criteria of the different versions.

The objective of the present invention is a method that induces the user to upgrade his/her product as soon as possible, and not when the centre ceases to support the version used by the user causing the stopping of the service.

This objective is achieved by a method for inducing upgrading of a security module of a previous generation for that of a new generation in a user unit connected to said security module and receiving from a control centre a data stream defining a plurality of services, characterised in that it consists in:

sending by the control centre in the data stream a replacement prompt command including the minimal characteristics of the security module of new generation;

establishing the characteristics of the security module being used and comparing with the minimal characteristics defined in the received command, and according to the results of the comparison, prompting the user to replace the security module

DETAILED DESCRIPTION

Figure 1:
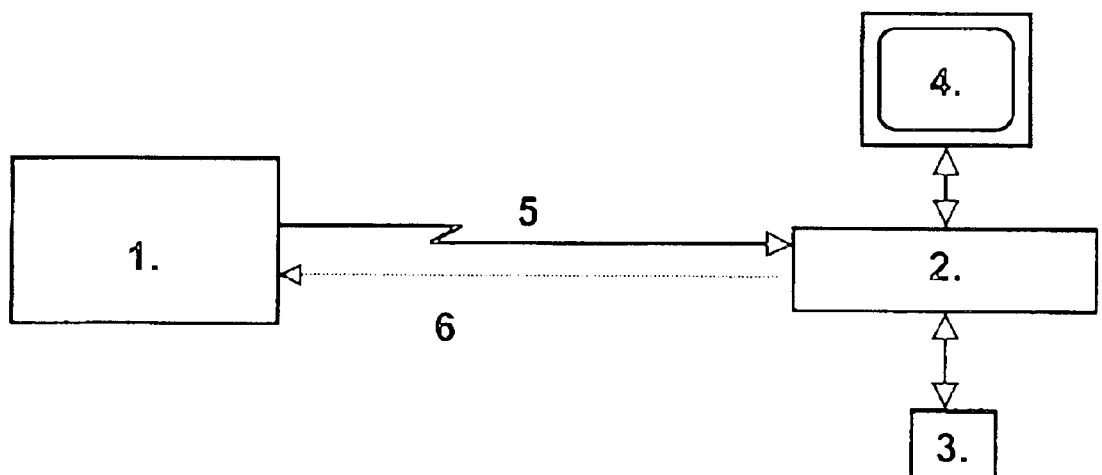
FIG. 1 is a block diagram of an embodiment including a control center, receiver/decoder, security module, and screen.

According to one embodiment, the product is a smart card that controls the access to a pay television. This card allows supplying the necessary information to decrypt the numerical stream and to manage the subscriptions to the different services offered by the operator. This card is connected to a pay television decoder that sends the decoded signals to a display. The process intended to convince the user to change his/her card is started by the control centre that sends to the subscriber's decoders an upgrading prompt through the usual communication channels.

Thus, according to the invention, the service given to the user is not interrupted but momentarily interfered in order to prompt the user to change his/her card for a more recent version.

According to a first embodiment, this interference or warning indication is carried out through the addition of a message on the display during a short time in order to remind the user to change his/her card.

This apparition can be done on command of the card itself and be repeated. The frequency of repetition can vary in time so that the warning indication becomes annoying to the user. In this way for example from one apparition per day it will be increased to one apparition per hour if no action is taken by the user.

This warning indication is also advantageously done at the start of the decoder.

Instead of a text message it is possible to add a pictogram, even a sequence of pictures describing the stages for changing the card.

According to one embodiment, this warning indication is not done in the form of a message but in the form of a simulation of a momentary reception breakdown. All or part of the display is briefly interfered with a notable effect on the user. The user will then be ready to replace his/her card as soon as possible in order to not see anymore the pictures disappearing.

A simple mean for doing this function is to use the control words necessary to decode the numerical stream. The card, precisely the one that has to be replaced, calculates these control words. It is then possible for this card to not supply a word and to provoke the interference on the display, the decoder being unable to decode the numerical stream.

Alternatively this control word can be supplied with a delay, during which the display will be interfered.

It is possible to mix both warning indication means, that is, if the user does not react to the invitation made in the form of a message, the method of the picture's scrambling will confirm the need to do the change.

Other important aspects of the invention are the determination on the one hand of the card's version and on the other hand of the moment to perform the warning.

Smart cards used in pay television decoders contain a relational database. Such an Organisation is described in the document EP 0 616 714 and tells us that the base does not contain only the data but that it also contains programs. Due to the relational Organisation of this information (data and programs) it is necessary to carry out a request of information to determine which is the state of the version of the database.

To determine the convenient moment to warn the user, several criteria have to be taken into account. It is clear that if the user is watching a film that he/she has especially purchased, it will be out of the question to interfere with the user's pleasure during this service. It will be preferable to choose programs included in the basic subscription and with a low emotional character as opposed to a sports competition.

The control centre, in this type of setting, does not only send a target version number as a minimal condition to not interfere the user's display. The centre can also condition this version to the presence of certain programs in the database.

In the case where the control centre receives information back from the different decoders, it is possible for the centre to determine itself the cards that need an upgrading. The control centre has means to address each card nominatively to send a starting command of the invitation to change process. This process can be interrupted either by the actual changing of the card of by a command from the control centre.

Other forms of warning, for example sonorous, can also be used in the range of this invention.

The use in a pay television system is not the only possible application. The generalisation of the pay services linked to Internet uses also security modules connected to user's computers. When a change is needed, for example to integrate new functions or to change an encrypting algorithm, the same problem arises and the present invention allows prompting the user to change the security module.

This prompt will take the form of a message on the display, a sound, or a graphical animation.

Another possibility is to slow down the performances of the security module each time it is requested. Thus a slowing down of this module functions is performed, a slowing down that is accompanied by a message indicating to the user the means to recover the original performances.

The single figure illustrates the system according to the invention that comprises a control centre 1 linked with one or several subscriber units composed of a receiver/decoder 2, a security module 3, and a display 4. For the good functioning of the operations related to the security of the received data 5, even the sent ones 6, the security module 3 is induced to supply the required keys or cryptograms.

One embodiment consists in including in the updgrading prompt message information telling the user that he/she will benefit from certain advantages or supplementary services after changing the security module. These advantages can be for example in the form of a supplementary credit, a free viewing of a film or an extension of the subscription period.

In a bidirectional system (pay television, Internet) the upgrading of the module is detected by the control centre that receives the data from the new module by means of the back channel. The control centre then transmits the necessary data to the security module allowing the introduction of the advantages or supplementary services.

In the case where there is no back channel (one-way) the changing of the module is not detected by the control centre. The data stream transmitted by the latter then contains specific data destined to the new module that includes functions that are ready to supply these advantages to the user. A variant of this implementation is possible by the introduction of conditions for granting supplementary services in the security module. As soon as it starts, it verifies the access conditions giving the right to these supplementary services, and if these conditions are fulfilled, it grants these services. They can have, for example, the form of a supplementary subscription to a channel during a time limited to one month.

What is claimed is:

1. A method for inducing the physical replacement of a security module of a previous generation for that of a new generation in a user unit connected to said security module comprising the steps of:

receiving a replacement prompt command including the minimal characteristics of the new generation of security module from the control center;

comparing the characteristics of the security module being used with the received minimal characteristics;

prompting the user to replace physically the security module according to the results of the comparison.

2. A method according to claim 1, wherein the prompting is done in the form of a text message on a display included in the user unit.

3. A method according to claim 2, wherein the prompting contains information related to the granting of supplementary services transmitted by the control center, the granting being conditioned on replacement of the security module.

4. A method according to claim 3, wherein the prompting is accompanied by a sonorous signal, in a musical or verbal form.

5. A method according to claim 4, wherein the security module is a smart card containing a relational database and wherein the characteristics of the security module being used are established by a relational type request to said database.

6. A method according to claim 3, wherein the security module is a smart card containing a relational database and wherein the characteristics of the security module being used are established by a relational type request to said database.

7. A method according to claim 2, wherein the prompting is accompanied by a sonorous signal, in a musical or verbal form.

8. A method according to claim 7, wherein the security module is a smart card containing a relational database and wherein the characteristics of the security module being used are established by a relational type request to said database.

9. A method according to claim 2, wherein the security module is a smart card containing a relational database and wherein the characteristics of the security module being used are established by a relational type request to said database.

10. A method according to claim 1, wherein the prompting is done in the form of one or several graphical images on a display included in the user unit.

11. A method according to claim 10, wherein the prompting is accompanied by a sonorous signal, in a musical or verbal form.

12. A method according to claim 11, wherein the security module is a smart card containing a relational database and wherein the characteristics of the security module being used are established by a relational type request to said database.

13. A method according to claim 1, wherein the prompting is accompanied by a sonorous signal, in a musical or verbal form.

14. A method according to claim 13, wherein the security module is a smart card containing a relational database and wherein the characteristics of the security module being used are established by a relational type request to said database.

15. A method according to claim 1, wherein the security module is a smart card containing a relational database and wherein the characteristics of the security module being used are established by a relational type request to said database.

16. A method according to claim 10, wherein the security module is a smart card containing a relational database and wherein the characteristics of the security module being used are established by a relational type request to said database.

17. A method according to claim 1, wherein the prompting is reproduced according to a determined cycle.

18. A method according to claim 1, wherein the prompting is carried out by creating a delay in the information supplied by the security module.

19. A method according to claim 1, wherein the user unit is a pay television decoder and the security module is responsible for the supply of the decrypting keys of a pay television stream, and wherein the prompting is done by interrupting the supply of said keys or by modifying them.

20. A method according to claim 19, wherein the data stream comprises indications on a nature of the transmitted programs and the prompting takes into account the nature of a program being seen.

21. A method according to claim 1, wherein the new security module comprises means to transmit an initialization message to the control center containing conditions of replacement, said control center granting access to one or several supplementary services upon receipt of the initialization message.

22. A method according to claim 1, further comprising the step of receiving a data stream transmitted by the control center containing specific messages destined to authorize access to one or several supplementary services only if the security module is upgraded.

23. A method according to claim 1, wherein the security module contains data relating to the conditions of granting supplementary services, from its starting, said module checks access conditions to the supplementary services and allows these supplementary services only if the granting conditions are fulfilled.

24. A method according to claim 1, further comprising the step of determining the characteristics of the security module being used.

* * * * *